(No Model.)
R. J. STRONG.
SEED SOWER.
No. 486,388. Patented Nov. 15, 1892.
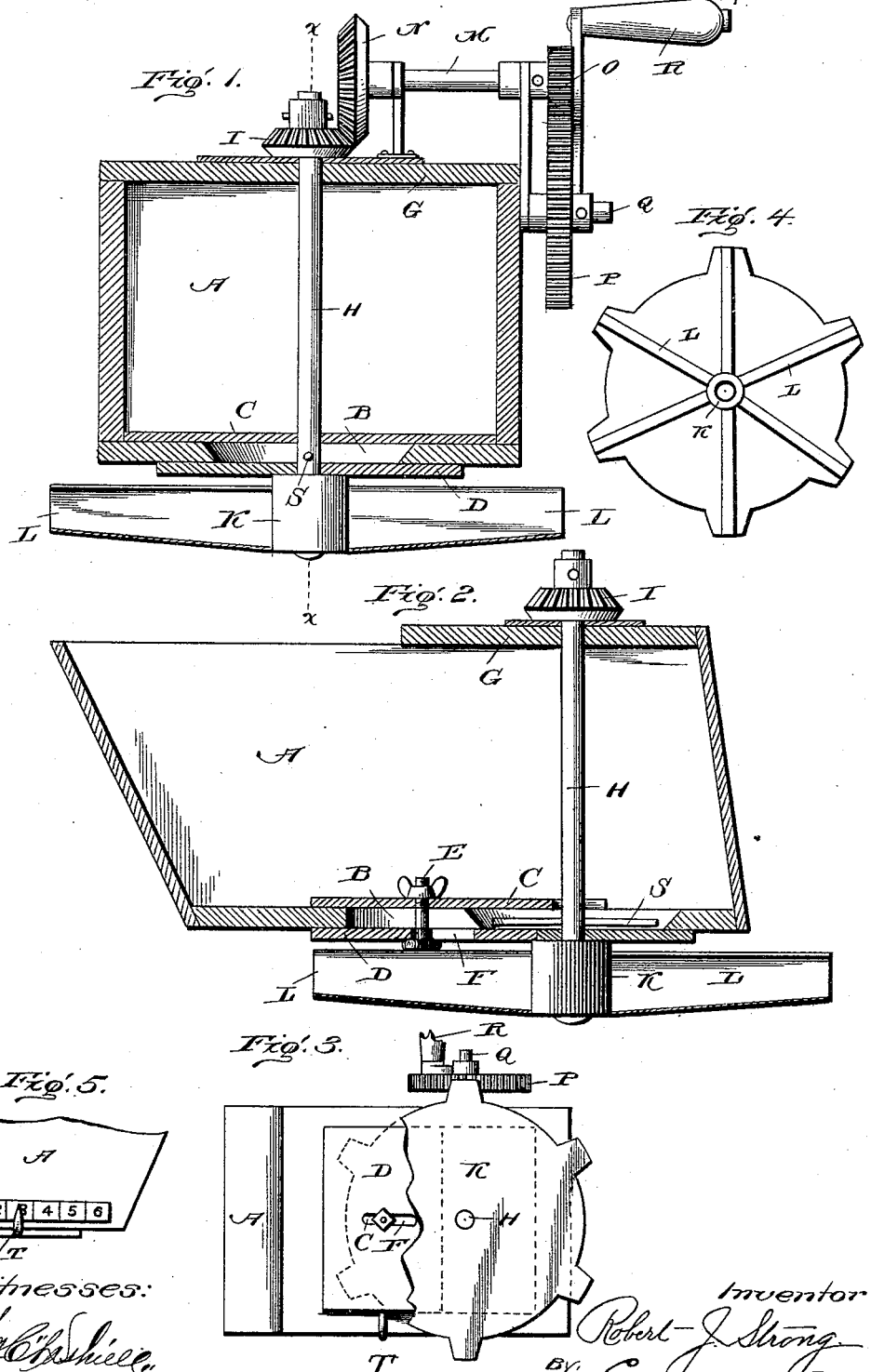

UNITED STATES PATENT OFFICE.

ROBERT J. STRONG, OF SHIREMANSTOWN, PENNSYLVANIA.

SEED-SOWER.

SPECIFICATION forming part of Letters Patent No. 486,388, dated November 15, 1892.

Application filed July 12, 1892. Serial No. 439,813. (No model.)

*To all whom it may concern:*

Be it known that I, ROBERT J. STRONG, a citizen of the United States, residing at Shiremanstown, in the county of Cumberland and State of Pennsylvania, have invented certain new and useful Improvements in Seed-Sowers; and I do hereby declare the following to be a full, clear, and exact description of the invention, such as will enable others skilled in the art to which it appertains to make and use the same.

My invention relates to improvements in hand-operated sowing-machines; and the object of the invention is to provide a portable and easily-operated machine adapted to uniformly sow or distribute different varieties of seed and in any desired quantity.

With these ends in view my invention consists of a hopper adapted to be supported in any suitable manner from the operator's shoulders and provided with a suitable discharge-opening, a sliding valve or gate arranged within the hopper and adapted to expose more or less of the discharge-opening therein, according to the size of the seed to be sown, a similar gate or valve arranged on the outside of the hopper and adapted to regulate the quantity of seed to be delivered to a distributing wheel or disk rigidly secured on one end of a shaft journaled in opposite walls of the hopper, a pinion attached to the other end of said shaft, and a driving-shaft journaled in bearings on the hopper and provided at one end with a gear-wheel which meshes with the pinion.

My invention further consists in the peculiar construction and arrangement of parts, as will be hereinafter more fully pointed out and claimed.

In the accompanying drawings, Figure 1 is a transverse vertical sectional view through the hopper and distributing-wheel. Fig. 2 is a longitudinal vertical sectional view on the line *x x* of Fig. 1. Fig. 3 is a bottom plan view. Fig. 4 is a detail top plan view of the distributing-wheel, and Fig. 5 is a detail view of a portion of one side of the hopper.

Like letters of reference denote corresponding parts in the several figures of the drawings, referring to which—

A designates the hopper of my portable hand-operated seeder, which is adapted to be suspended from a person's shoulders by means of straps or other suitable suspending or supporting means. In the bottom of the hopper A is formed a discharge opening or aperture B, which aperture is adapted to be exposed or closed to any desired extent by a slide or gate C, arranged within and adapted to be moved over the bottom of the hopper. The sides of the discharge opening or aperture are made inclined to form a funnel-shaped passage for the grain or seed in the hopper A to said discharge-opening B. On the outside of the hopper A is arranged a regulating slide or gate D, and the two slides C D are connected by means of a through-bolt E, provided at one end with a suitable head and at its other end with a nut, whereby the slides C D can be held firmly in any desired position with relation to the discharge-opening in the bottom of the hopper, the through-bolt E passing through a suitable longitudinal slot in the bottom of the hopper to allow a limited movement of the slides C D to regulate the size of the discharge-opening B.

To enable the slides C D to be adjusted independently of each other, for a purpose to be hereinafter pointed out, a longitudinal slot F is formed in the lower slide D, through which the bolt E passes, as shown in Fig. 3, so that when it is desired to move the slide C without moving the other slide D it is only necessary to loosen the nut on the through-bolt, when said slide can be moved the desired distance and again secured in place by tightening the securing-nut, the through-bolt moving freely in the slots in the bottom of the hopper and slide D. The slide D can be moved freely on the bolt, if desired.

The upper side of the hopper is partially covered by a cover G, and in the top and bottom of the hopper is journaled a vertical shaft H, to the upper end of which is rigidly attached a pinion I. To the lower end of the vertical shaft H, below the bottom of the hopper A, is rigidly attached a seed-distributing wheel or disk K, and this wheel or disk is of such size as to extend completely across the discharge-opening B below the hopper, so that any seed or grain escaping from the hopper through such discharge-opening will fall upon the distributing-wheel K.

On the upper surface of the distributing-wheel K are arranged a series of radial flanges or ribs L, which extend from the hub or center of said wheel to and project slightly beyond the periphery thereof.

In suitable bearings on the cover or top G is journaled a horizontal driving-shaft M, provided at one end with a gear-wheel N, which meshes with the pinion I on the upper end of the vertical shaft H and at its other end with a gear-wheel O. With the gear-wheel O meshes another and larger gear-wheel P, mounted on the stub-axle Q, attached to the side of the hopper A, and said wheel P is adapted to be driven or rotated by a handle or crank R.

On the shaft H, within the hopper, and preferably in the funnel entrance or passage to the discharge-opening B, is secured an agitator-arm S, which may extend on opposite sides of said vertical shaft, and which operates, when said shaft is rotated, to force the grain or seed in the hopper out through the discharge opening or outlet B and onto the distributing-wheel K.

The operation of my invention may be stated as follows: The inner slide or gate C is adjusted to regulate the size of the discharge-opening B according to the nature and size of the seed to be sown. Thus if it is desired to sow oats, wheat, or rye the slide C is moved to increase the size of the discharge-opening from that used when clover, timothy, or other grass seed is to be planted. The hopper is suspended or supported from a person's shoulders or body in any desired and well-known manner, and a sack or bag containing the seed to be planted is attached to said hopper, so as to communicate therewith, as is common in this class of machines. The regulating-slide D is adjusted to regulate the quantity of seed to be delivered to the distributing-wheel K. Thus if it is desired to sow the seed thickly the slide will be withdrawn to expose all or nearly all of the discharge-opening B, while if it is desired to sow the seed scant or far apart the discharge-opening will be nearly closed. To enable the regulating-slide D to be readily adjusted and the operator to ascertain at a glance the size of the discharge-opening B, I may attach to said slide an arm or handle T, which extends along the under side of the bottom of the hopper A, and is provided at its outer end with an upwardly-extending knob or button, which may align with one of a series of graduations on a scale which may be attached to the side of the hopper and thus enable the operator to readily vary the position of the slide D and ascertain the extent of exposure of the opening B. By turning the crank or handle R the driving-shaft M is revolved, and this in turn revolves the vertical shaft H and seed-distributing wheel K carried thereby. The seed in the hopper is forced out through the discharge-opening B in the bottom of the hopper by the agitator-arm S and falls into the different pockets formed on the wheel K by the radial flanges or ribs L thereon as said pockets are successively brought under said discharge-opening through the revolution of the shaft H and wheel K. The seed falling on the wheel K is cast or thrown forcibly therefrom by centrifugal action and uniformly distributed over the ground on all sides of the machine.

From the foregoing description, taken in connection with the drawings, it will be seen that I have provided a light, simple, and easily-operated machine, which can be used to uniformly distribute seed or grain of different kinds and in any desired quantity.

I am aware that changes in the form and proportion of parts and details of construction of the devices herein shown and described as an embodiment of my invention can be made without departing from the spirit or sacrificing the advantages thereof, and I therefore reserve the right to make such changes and alterations as fall within the scope of my improvements.

Having thus fully described my invention, what I claim as new, and desire to secure by Letters Patent, is—

1. The combination of a hopper provided with a discharge-opening, a slide arranged within the hopper and adapted to vary the size of the discharge-opening therein, a distributing-wheel arranged below the discharge-opening in the hopper, means for revolving said wheel, and another slide arranged between the hopper and the distributing-wheel, substantially as and for the purpose described.

2. In a machine of the character described, the combination of a hopper provided with a discharge-opening, a slide arranged within the hopper and adapted to vary the size of the discharge-opening, a through-bolt attached to said slide and extending through aligned slots formed in one wall of the hopper, and a slide arranged on the outside thereof, a shaft journaled in opposite walls of the hopper at one side of the discharge-opening and provided with a distributing-wheel, and means for revolving said shaft and wheel, substantially as described.

In testimony whereof I affix my signature in presence of two witnesses.

ROBERT J. STRONG.

Witnesses:
W. H. KISTER,
GEO. S. COMFORT.